Oct. 16, 1934.  F. R. HANSEN  1,977,273
TRACTOR GUIDE
Filed Sept. 6, 1932   3 Sheets-Sheet 2
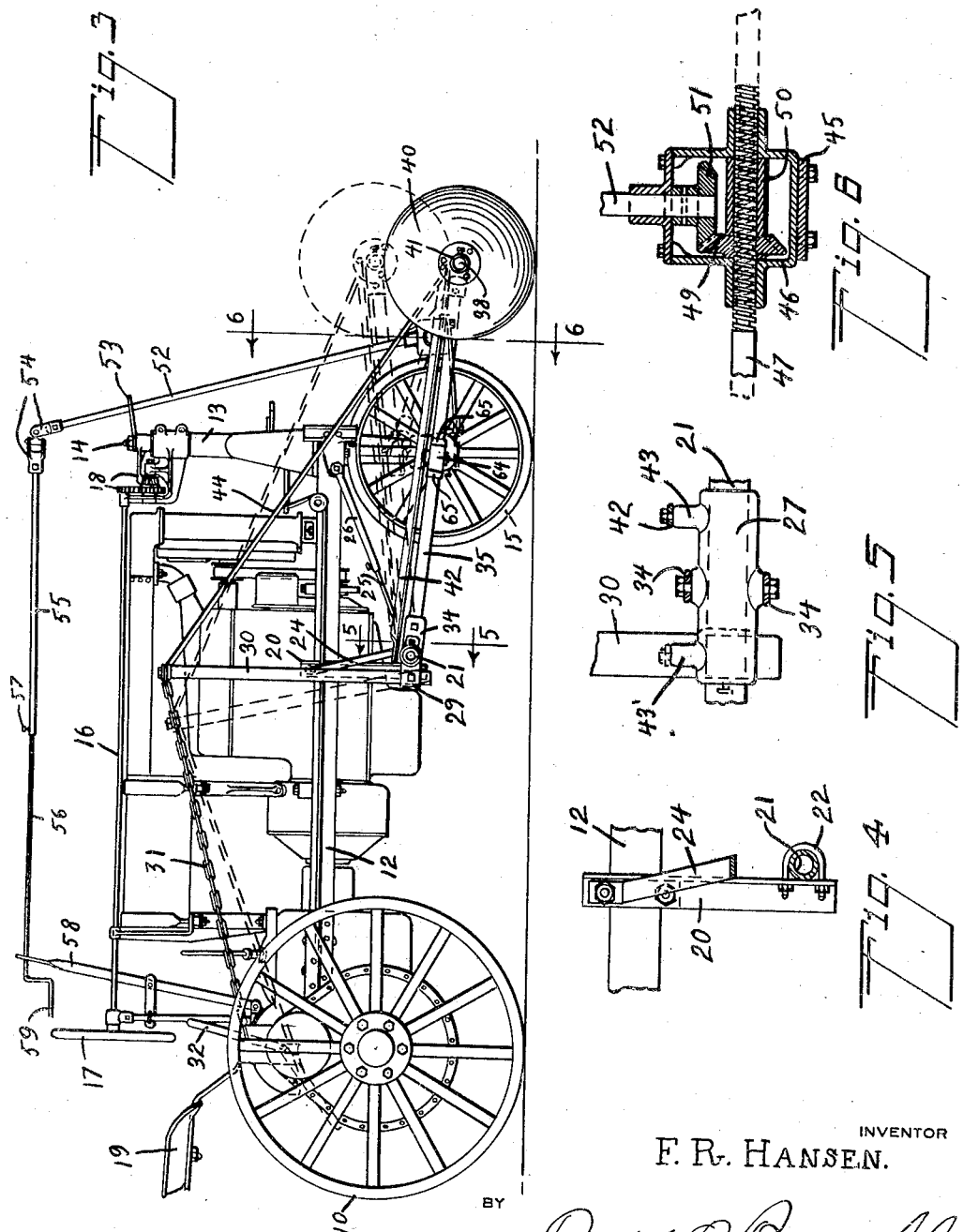
INVENTOR
F. R. HANSEN.
BY
David O. Barnell
ATTORNEY Oct. 16, 1934.    F. R. HANSEN    1,977,273
TRACTOR GUIDE
Filed Sept. 6, 1932    3 Sheets-Sheet 3
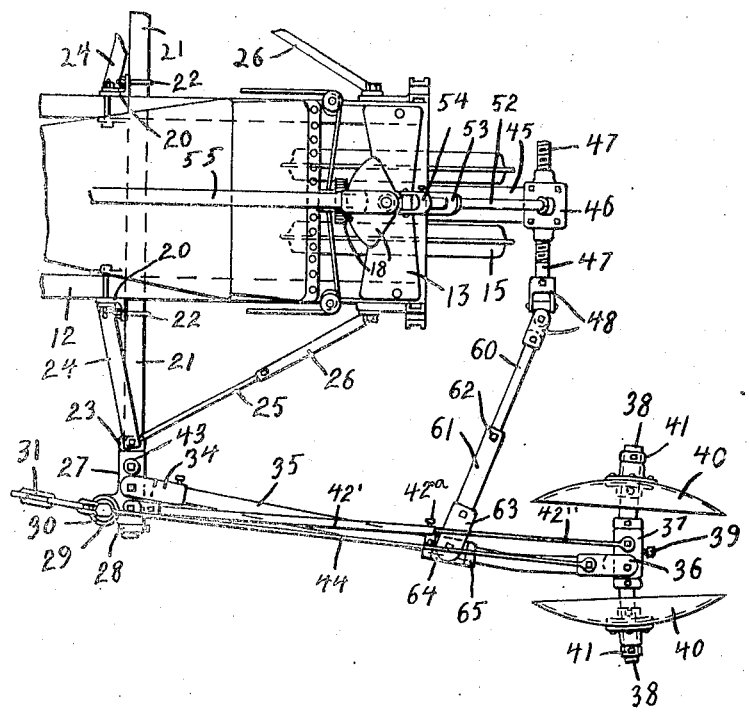
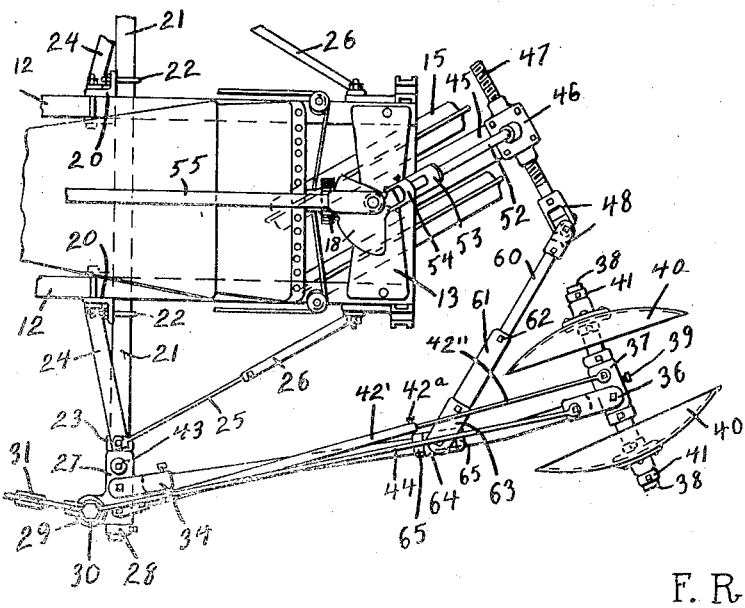
INVENTOR
F. R. HANSEN.
BY
David O. Barnell
ATTORNEY

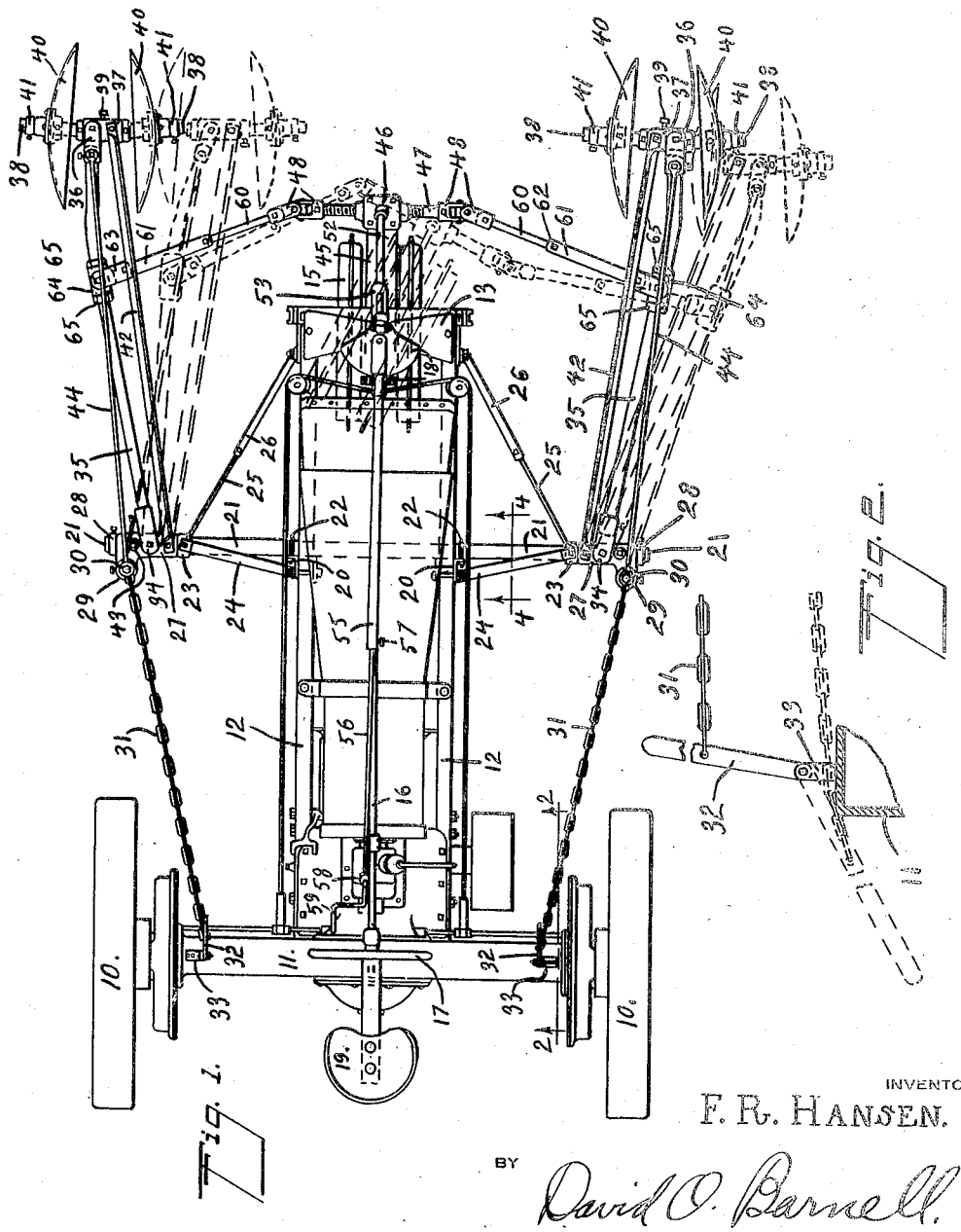

Patented Oct. 16, 1934

1,977,273

UNITED STATES PATENT OFFICE 1,977,273

TRACTOR GUIDE

Fremont R. Hansen, Honey Creek, Iowa, assignor to Ray Lillydell, Brunning, Nebr.

Application September 6, 1932, Serial No. 631,742

6 Claims. (Cl. 97—49)

My invention relates to tractor guides, or devices for automatically steering a tractor when the same is used for plowing, listing, cultivating row-crops, or other agricultural operations upon ground which is ridged or furrowed along lines conforming with the desired line of travel of the tractor. It is the object of my invention to provide a tractor guide of simple and inexpensive construction, which may be readily applied to tractors of standard design, and which may be employed for all operations in which the desired path of the tractor is in conformity with adjacent ridges or furrows. A further object is to provide a tractor-guide with which the ground-engaging devices may be quickly and easily moved from and to operative position. A further object is to provide tractor-guiding means having a minimum extension forwardly and laterally of the tractor. A further object is to provide a tractor guide having "side-hill" adjusting devices which are under control of the operator at all times, whereby the path of the tractor, or of implements drawn thereby, may be kept in the desired relation to the guiding furrow or ridge while traversing surfaces which slope laterally of the line of travel, and of which the pitch or gradient of the slope varies at different parts of the path. A further object is to provide means which may be arranged optionally, according to the class of work for which the tractor is being used, whereby the axis of the ground-engaging members may either be kept in parallelism with the tractor-frame and driving-wheels, or caused to swing in conformity with variations in the direction of the guiding furrow, and thereby avoid a tendency to run out of the furrow when rounding a turn or effecting a relatively abrupt change in the path of the tractor. More particular objects of my invention will appear hereinafter.

In the accompanying drawings, Fig. 1 is a plan view of a tractor equipped with guide mechanism embodying my invention, Fig. 2 is a partial section on line 2—2 of Fig. 1, affording a detail side view of one of the control-levers, Fig. 3 is a side view of the tractor and guide mechanism, Fig. 4 is a detail vertical section on the line 4—4 of Fig. 1, Fig. 5 is a detail vertical section on the line 5—5 of Fig. 3, Fig. 6 is a detail section on the line 6—6 of Fig. 3, Fig. 7 is a partial plan view, showing the special controlling means for the furrow-disk-axis in position for normal or straight-ahead movement, and Fig. 8 is a similar view showing positions of the same parts when making a turn.

In the drawings, my guide mechanism is shown as applied to a tractor of a standard row-crop type, having widely spaced rear drive-wheels 10, a high rear transverse frame-member or countershaft-housing 11, longitudinal frame-members 12 extending from said member 11 to a front bolster 13, a vertical axle-shaft 14 mounted rotatably in said bolster and having at its lower end a short front axle on which are the closely spaced front wheels 15, a longitudinal steering-shaft 16 having a hand steering-wheel 17 at its rear end and gearing 18 operatively connecting its front end with the upper portion of the vertical axle-shaft 14, and an operator's seat 19 carried upon the transverse frame-member 11 and positioned behind the steering-wheel 17.

In applying the guide mechanism to the tractor, I provide a pair of vertical bracket-arms 20 which are bolted to intermediate portions of the longitudinal frame-members 12, and extend downwardly therefrom in transverse alinement with each other. To the lower portions of said arms 20 a horizontal transverse tubular beam 21 is secured by means of U-bolts 22, the ends of said beam being approximately in line with the outer sides of the drive-wheels 10. On the laterally extending portions of the tubular beam 21 are affixed collars 23, from which brace-bars 24 are extended diagonally upward and connected with the upper portions of the bracket-arms 20. Also connected with said collars 23 are brace-rods each formed by a pair of telescoping members 25 and 26, said brace-rods extending obliquely forward, upward and inward, and their ends being secured to the frame-members 12 adjacent to the front bolster 13. On the portions of the tubular beams 21 which project outwardly from the collars 23, are tiltably mounted the fulcrum-sleeves 27 which are retained in place longitudinally of the beam by means of set-collars 28 secured on the ends of the beam, so that the sleeves are between the collars 23 and 28. Each sleeve 27 has formed integrally therewith, at its rear side adjoining its outer end, a socket 29 in which is secured the lower end of an upwardly extending tubular arm or strut 30. To the upper end of said strut 30 is connected a chain 31 which extends rearwardly therefrom and is connected with a control-lever 32 fulcrumed on a bracket-lug 33 which is mounted on the frame-member 11, as best shown in Figs. 1 and 2. The intermediate portion of the sleeve 27 is straddled by a forked head 34 on the rear end of a tubular arm 35, said forked head being pivotally connected with the sleeve on a substantially vertical axis, so that the arm is swingable transversely of the tractor-frame in an approximately horizontal plane. On the front end of said arm 35 is a forked head 36, and said head straddles a sleeve 37 which is pivotally connected therewith to swing about a substantially vertical axis. The disk-axle 38 extends through the bore of said sleeve 37 and is held therein by a set-screw 39. Disks 40 are mounted revolubly on the end portion of said axle 38, between collars 41 which are adjustably secured thereon by suitable set-screws, as shown. In the illustrated arrangement of the parts, the end portions of the disk-axle are forwardly inclined, so that the disks "toe in" or converge toward their front edges. For some uses, however, the axle 38 may be turned in the sleeve 37 to a position at which the incline of the end portions is downward, thus causing a convergence of the disks toward their lower edges. Also, for straddling ridges, the disks 40 may be reversed or disposed with their convex sides toward each other, and it may then be desirable to turn the axle so that the planes of rotation of the disks converge rearwardly or upwardly. Swing of the disk-axle-sleeve 37 about its pivotal axis on the forked head 36, is controlled by a rod or bar 42 having its front end pivotally connected with the sleeve 37 near the inner end thereof, and its rear end normally connected pivotally with an upstanding lug 43 on the inner end portion of the sleeve 27, the pivoted ends of the bar 42 being equidistant from the axes of the pivotal connections of the heads 34 and 36 with the respective sleeves 27 and 37. A brace-rod 44 is connected with each arm 35 near the front end thereof, and extends diagonally upward and rearward to connect pivotally with the upper portion of the respective strut 30, said pivotal connection being substantially in alinement with the pivotal axis of the head 34 on the sleeve 27, so that free lateral swinging of the arm 35 is permitted. By swinging of the control-levers 32 rearwardly to the position shown by dotted lines in Figs. 2 and 3, the chains 31 are placed under tension, the upper ends of the struts 30 swung rearwardly, the sleeves 27 slightly rotated about the transverse beam 21, and the arms 35 swung upwardly to the raised or carrying position indicated by dotted lines in Fig. 3, at which the disks are disengaged from the ground. In said carrying position the control-levers are below a dead-center position relative to the pull of the chains 31 thereon, or so that the line of tension of the chains passes below the fulcrums of the levers, and the pull of the chains merely presses the levers against the frame-member 11 as a stop therefor.

To the front axle, between the wheels 15, there is secured a short rigid tongue 45 which projects forward horizontally slightly beyond said wheels, and at the front end thereof carries a casing or housing 46. Extending transversely through said housing is a screw-threaded rod 47 on which universal-joint couplings 48 are carried at the ends, which project laterally from the housing. On the threaded intermediate portion of said rod, within the housing, is disposed a bevel gear 49 of which the bore is threaded to engage the threads of the rod, the gear being held revolubly against one end of the housing by means of a sleeve 50 fitting over the rod between the gear and the opposite end of the housing, as shown in Fig. 6. The gear 49 meshes operatively with a second bevel gear 51 carried upon the lower end of a shaft 52, said shaft having a bearing in the top of the housing 46, and from said bearing extending upwardly, with a slight rearward inclination, to pass through an upper bearing formed in an arm 53 secured to and extending forwardly from the upper end of the axle-shaft 14. Said shaft 52 is continued upwardly to a point above the axle-shaft 14, and at its upper end is connected with a universal-joint coupling 54. From said coupling a horizontal telescoping shaft extends rearwardly above the upper portion of the tractor, said telescoping shaft comprising a tubular member 55 attached directly to the coupling, and a rod 56 fitting slidably in the rear portion of said tubular member and connected adjustably therewith by a set-screw 57. The rear portion of the rod 56 fits rotatably in a support 58 attached to the support-bracket of the steering-wheel 17, and a crank 59, formed by bending the rear end of the rod 56, is positioned adjacent to the steering-wheel, as shown in Figs. 1 and 3, so as to be in convenient reach of the operator of the tractor. Rotation of said crank 59 is communicated through the telescoping horizontal shaft, coupling 54, shaft 52, and gear 51 to the gear 49, and by rotation of the latter the threaded rod 47 may be moved longitudinally to increase the extension thereof at one side of the housing 46 and simultaneously reduce the extension thereof at the opposite side.

To the couplings 48 at the ends of the screw-rod 47 are connected the inner ends of rods 60, of which the outer portions fit telescopingly in tubular members 61, being held in adjusted relations therein by set-screws 62. The outer ends of the tubular members 61 have forked heads 63 which straddle sleeves 64 mounted revolubly on the intermediate portions of the swinging arms 35 and retained longitudinally thereon by set-collars 65, said heads 63 and sleeves 64 being pivotally connected on substantially vertical axes. The universal-joint couplings 48, and the pivotal mounting of the sleeves 64 on the arms 35, allow said arms 35 to be swung to the raised or carrying position above referred to, and indicated by dotted lines in Fig. 3, and when said arms are in the carrying position at both sides of the tractor, the latter is guided by the usual manual steering means, the lateral swing of the guide-tongue 45 being communicated to the arms 35 through the screw-rod 47, couplings 48, and the connecting-rods formed by the members 60, 61 and 63. When the guide devices are to be used for automatic steering of the tractor, the same is first driven into a position alongside the ridge or furrow which is to be followed, and so that the guide-disks 40 at one side of the tractor are in register with the ridge or furrow. Then the arm 35 on which said disks are carried is dropped into working position by swinging the respective control-lever 32 upward until the line of tension of the chain 31 passes above the fulcrum of the lever, after which the disks drop into engagement with the ridge or furrow, and thereafter any deviation of the guiding ridge or furrow from the line of travel of the tractor causes the arm 35 to swing laterally relative to the tractor-frame, the swinging movement is communicated to the guide-tongue 45, and the wheels 15 are turned appropriately to direct the tractor in conformity with the furrow or ridge.

The spread or normal spacing of the guide-disks 40 from the center-line of the tractor-frame may be varied within determined limits by adjustments in the relation of the telescoping members 60 and 61 of the connecting-rods between the swinging arms 35 and the guide-tongue 45. For side-hill operation, where the slope of the ground tends to swing the tractor or the implements drawn thereby in a down-hill direction, a temporary increase or reduction of the spread or lateral spacing of the guide-disks from the center-line of the frame, is effected by turning the crank 59 to increase or reduce the lateral extension of the rod 47 at the side toward the guide-disks which are in operating engagement with the ground. Such adjustments may be made by the operator at any time, without stopping the forward movement of the tractor, and without use of the manual steering means while effecting the adjustment, and, as the side-hill adjustments are made during the motion of the tractor, any desired variation may be made at any time, should variation in the slope of the ground cause a deviation of the implements from the desired line of travel. For operations throughout which the guiding furrow or ridge is at the same side of the tractor, so that only one of the guide-arms 35 is used, the other or unused guide-arm, and its connecting-rod and control-lever, need not be placed upon the tractor. For operations, such as plowing in a closed or continuous circuit, wherein it may be desirable for the guide devices to cause relatively abrupt changes in the path of the tractor, the special disk-axle control means shown in Figs. 7 and 8 may be employed. In the normal arrangement heretofore described, the axle-sleeve 37 is maintained constantly in parallel relation with the sleeve 27 on the cross-beam 21, by means of the rod or control-bar 42 which connects the sleeves 27 and 37. The sleeve 27 is provided near its outer end with an upstanding lug 43', with which the control-bar for the axle-sleeve may be connected, instead of the lug 43 as in the normal arrangement. When the special connection is to be employed, the control-bar is preferably made adjustable in length, being formed by telescoping members 42' and 42" held in adjusted relations by a set-screw 42ᵃ, as shown in Figs. 7 and 8. The length of the telescoping control-bar is so adjusted that in the normal position of the guide-arm 35, at which the guide-tongue 45 is held in centered position, the axle-sleeve 37 is parallel with the sleeve 27, as shown in Fig. 7; but when the guiding furrow deviates from a straight line, so that the arm 35 is swung laterally relative to the tractor-frame, the crossed-over relation of the control-bar to the arm 35 causes the axle-sleeve 37 to swing in the same direction as the guide-arm, out of parallel relation with the sleeve 27, as shown in Fig. 8, whereby said sleeve 37 assumes a position more nearly transverse to the curving or deviating portion of the guide-furrow, and any tendency for the disks 40 to climb the sides and run out of the furrow is thereby avoided.

It will be seen from the foregoing that my invention provides a tractor guide which may be used for all purposes, and in which the guide devices are not extended laterally of the tractor farther than is necessary to engage the guiding furrow or ridge, nor extended forwardly of the tractor wheels far enough to interfere with turning of the tractor close to fences or other obstructions. It will be seen further that the arrangement of the guide-arms and disks is such that the disks may be very quickly and easily raised out of operative engagement with the ground, or dropped into working position, by movement of the control-levers 32, located conveniently to the seat 19 for the operator. The ease of operation, due to the short lift of the furrow-disks, is especially desirable when operating on wet and sticky soils which adhere to the disks and greatly increase the weight required to be lifted when raising the disks out of working position. It will be seen further that the adjusting devices for side-hill operation enable the operator, by occasionally changing the spread or lateral extension of the guide-arm which is in use, to compensate for any variation in the slope of the surface traversed, and thus maintain the tractor, or implements drawn thereby, in the desired path at all times, without resorting to use of the manual steering means.

Now, having described my invention, what I claim and desire to secure by Letters Patent is:

1. In a guiding attachment for tractors having a rigid frame and steering means including an axle-member swingable about a substantially vertical axis and means for manually actuating said axle-member; a guide-tongue affixed to and extending forwardly from said axle-member, a cross-beam affixed to the tractor-frame and extending laterally thereof, fulcrum-sleeves mounted pivotally on the end portions of said cross-beam to swing about transverse horizontal axes, guide-arms pivoted on said fulcrum-sleeves to swing about substantially vertical axes, said guide-arms extending forwardly from said fulcrum-sleeves, disk-axle sleeves pivotally connected with the front ends of said guide-arms to swing about substantially vertical axes, control-arms connecting said fulcrum-sleeves and axle-sleeves and effecting swinging movements of the latter in conformity with lateral swing of the guide-arms, and connecting means between said guide-arms and guide-tongue.

2. In a guiding attachment for tractors having a rigid frame and steering means including an axle-member swingable about a substantially vertical axis and means for manually actuating said axle-member; a guide-tongue affixed to said axle-member, a cross-beam affixed to the tractor-frame and extending laterally thereof, a fulcrum-sleeve mounted pivotally on said cross-beam to swing about a horizontal axis transverse to the tractor-frame, a guide-arm connected pivotally with said fulcrum-sleeve on a substantially vertical axis and extending forwardly therefrom, means connecting said guide-arm and said guide-tongue, ground-engaging means connected pivotally with the front portion of the guide-arm to swing about a substantially vertical axis, and means connecting said fulcrum-sleeve and ground-engaging means for controlling swing of the latter about its vertical pivotal axis.

3. In a guiding attachment for tractors having a rigid frame and steering means including an axle-member swingable about a substantially vertical axis and means for manually actuating said axle-member; a guide-tongue affixed to and extending forwardly from said axle-member, a cross-beam affixed to the tractor-frame and extending laterally from an intermediate portion thereof, a fulcrum-sleeve mounted pivotally upon the outer terminal portion of said cross-beam to swing about a horizontal axis transverse to the tractor-frame, a guide-arm extending forwardly from said fulcrum-sleeve and pivoted thereon to swing transversely of the tractor-frame, a strut affixed to and extending upwardly from said fulcrum-sleeve, a brace connected with the upper portion of said strut and extending to the front portion of the guide-arm to support the same, actuating means connected with said strut and controlling vertical swing of the guide-arm, ground-engaging guide-means pivotally connected with the front portion of the guide-arm to swing about a substantially vertical axis, a rod having its ends connected pivotally with said fulcrum-sleeve and said ground-engaging guide-means on substantially vertical axes spaced laterally from the axes of the guide-arm pivots, and means connecting said guide-arm and guide-tongue.

4. In a guiding attachment for tractors having a rigid frame and steering means including an axle-member swingable about a substantially vertical axis and a manually actuated steering-wheel operatively connected with said axle-member; a guide-tongue affixed to said axle-member; a guide-arm pivotally connected with the tractor-frame to swing transversely thereof, a threaded rod carried by said guide-tongue and extending laterally thereof, means connecting said rod and guide-arm, a rotatable threaded member engaging said threaded rod and held in fixed transverse relation to the guide-tongue, and rotatable flexible actuating means connected operatively with said threaded member and extending adjacent to said steering-wheel.

5. In a guiding attachment for tractors having a rigid frame and steering means including an axle-member swingable about a substantially vertical axis and a manually actuated steering-wheel operatively connected with said axle-member; a guide-tongue affixed to said axle-member and swingable laterally of the tractor-frame to guide the tractor, a guide-arm connected pivotally with the tractor-frame and swingable laterally thereof, ground-engaging means carried at the free end of said swinging guide-arm, means connecting said guide-arm and guide-tongue whereby lateral swing of the former may be communicated to the latter, and adjusting means for varying the effective length of said connecting means, said adjusting means including relatively rotatable screw-threaded members, a manually rotatable element positioned adjacent to the steering-wheel, and flexible actuating means connecting said element with one of the screw-threaded members for rotating the same relative to the other.

6. In a guiding attachment for tractors having a rigid frame and steering means including an axle-member swingable about a substantially vertical axis and a manually actuated steering-wheel operatively connected with said axle-member; a guide-tongue affixed to said axle-member and swingable laterally of the tractor-frame to guide the tractor, a guide-arm connected pivotally with the tractor-frame and swingable laterally thereof, ground-engaging guide-means carried by said guide-arm, means connecting said guide-arm and guide tongue whereby lateral swing of the former may be communicated to the latter, and adjusting means for varying the effective length of said connecting means, said adjusting means including a threaded rod, a rotatable threaded member engaging said threaded rod, a manually rotatable element positioned adjacent to the steering-wheel, and rotatable flexibly connected shafts operatively connecting said element and said rotatable threaded member.

FREMONT R. HANSEN.